(12) United States Patent
Fuh et al.

(10) Patent No.: US 9,175,866 B2
(45) Date of Patent: Nov. 3, 2015

(54) DUSTPROOF DEVICE FOR HEAT SINK

(71) Applicant: DELTA ELECTRONICS, INC., Taoyuan County (TW)

(72) Inventors: Huw-Ching Fuh, Taoyuan County (TW); Shen-Feng Chan, Taoyuan County (TW); Chun-Chin Chang, Taoyuan County (TW)

(73) Assignee: DELTA ELECTRONICS, INC. (TW)

( * ) Notice: Subject to any disclaimer, the term of this patent is extended or adjusted under 35 U.S.C. 154(b) by 310 days.

(21) Appl. No.: 13/858,593

(22) Filed: Apr. 8, 2013

(65) Prior Publication Data

US 2014/0230382 A1 Aug. 21, 2014

(30) Foreign Application Priority Data

Feb. 19, 2013 (CN) .......................... 2013 1 0053200

(51) Int. Cl.
| | |
|---|---|
| *B01D 50/00* | (2006.01) |
| *F24F 3/16* | (2006.01) |
| *B01D 45/08* | (2006.01) |
| *B01D 45/12* | (2006.01) |
| *B01D 45/06* | (2006.01) |
| *B01D 45/16* | (2006.01) |

(52) U.S. Cl.
CPC .............. *F24F 3/1603* (2013.01); *B01D 45/06* (2013.01); *B01D 45/08* (2013.01); *B01D 45/12* (2013.01); *B01D 45/16* (2013.01); *B01D 50/002* (2013.01); *F24F 3/16* (2013.01)

(58) Field of Classification Search
CPC .......... F24F 3/1603; F24F 3/16; B01D 45/08; B01D 50/002; B01D 45/12; B01D 45/06; B01D 45/16
USPC ........................... 55/327, 332, 465, 442–446
See application file for complete search history.

(56) References Cited

U.S. PATENT DOCUMENTS

| | | | | |
|---|---|---|---|---|
| 3,910,782 | A * | 10/1975 | Struble et al. ................... | 55/444 |
| 3,945,812 | A * | 3/1976 | Doane .............................. | 95/272 |
| 4,830,644 | A * | 5/1989 | Gutermuth ....................... | 55/436 |
| 5,342,422 | A * | 8/1994 | Wimbock ......................... | 55/444 |
| 6,454,825 | B1 * | 9/2002 | Cheimets et al. ................ | 55/446 |
| 6,656,244 | B1 * | 12/2003 | Galassi ............................ | 55/444 |
| 6,833,022 | B2 * | 12/2004 | Feisthammel et al. ............ | 95/91 |
| 7,041,159 | B2 * | 5/2006 | Entezarian et al. ............. | 96/135 |
| 7,166,140 | B2 * | 1/2007 | Entezarian et al. ............. | 55/320 |
| 7,585,345 | B2 * | 9/2009 | Smasal et al. ................... | 55/443 |
| 8,182,587 | B2 * | 5/2012 | Hiner et al. ..................... | 95/268 |
| 2007/0056578 | A1 * | 3/2007 | Aviles ........................ | 126/299 D |
| 2008/0110339 | A1 * | 5/2008 | Kwok et al. ...................... | 95/31 |
| 2008/0202083 | A1 * | 8/2008 | Graham et al. .................. | 55/444 |

* cited by examiner

Primary Examiner — Dung H Bui
(74) Attorney, Agent, or Firm — Hauptman Ham, LLP

(57) ABSTRACT

A dustproof device is disclosed. The first blade set includes a plurality of first blades. The first blade has a first linking portion and a first blocking portion. The first blocking portion forms a first opening with another first linking portion of an adjacent first blade. The second blade set includes a plurality of second blades. The second blade has a second linking portion and a second blocking portion. The second blocking portion forms a second opening with another second linking portion of an adjacent second blade. Dust or particles entering the first blade set will be blocked by the second blade set and fallen between the first blade set and the second blade set.

19 Claims, 8 Drawing Sheets

DUSTPROOF DEVICE FOR HEAT SINK

BACKGROUND OF THE INVENTION

1. Field of the Invention

The present invention generally relates to dustproof devices and, in particular to a dustproof device installed in an air inlet of a heat sink.

2. Description of Related Art

Nowadays air conditioner equipment is an important temperature-controlling facility for providing comfortable living temperature and humidity in living environment. Furthermore, batteries or electronic components of communication devices in cabinets will operate normally under a proper temperature. Thus, poor heat dissipation in surrounding environment will result in overheating and a service life might be reduced.

Moreover, air conditioner equipment not only controls temperature and humidity, but also keeps air quality and cleanliness. Therefore, air quality is an important part of the air conditioner equipment. Air conditioner equipment or a ventilation system usually filters out air by air filters to fulfill a qualified indoor cleanliness. Hence air conditioner equipment must have a good purifying device for air conditioner equipment for providing a qualified indoor air quality and cleanliness.

However, when air conditioner equipment is installed in a bad environment outdoors, such as in a desert area, the replacement frequency of air filters is very often that leads to a high maintenance cost of air conditioner equipment.

In view of the above drawbacks, the Inventor proposes the present invention based on his expert knowledge and elaborate researches in order to solve the problems of related art.

SUMMARY OF THE INVENTION

Accordingly, an object of the present invention is to provide a dustproof device for heat sink, which is installed in front of an air inlet for stopping dust entering a heat sink and achieving a dustproof effect.

Another object of the present invention is to provide a dustproof device for heat sink, which can be used to achieve a dustproof effect by multiple (layers) blockings for reducing replacement frequency of filters.

In order to achieve the object mentioned above, the present invention provides a dustproof device for a heat sink. The heat sink has an air inlet, and the dustproof device includes a first blade set and a second blade set. The first blade set is disposed in a lateral side of the air inlet. The first blade set includes a plurality of first blades arranged in parallel and at intervals. Each first blade has a first linking portion and a first blocking portion extended from the first linking portion. The first blocking portion is bent in a direction toward the heat sink and formed a first opening with an adjacent first blade. The second blade set is disposed between the first blade set and the air inlet. The second blade set includes a plurality of second blades arranged in parallel and at intervals. Each second blade has a second linking portion and a second blocking portion extended from the second linking portion. The second blocking portion is bent in a direction away from the heat sink and formed a second opening with an adjacent second blade.

In order to achieve the object mentioned above, the present invention provides a dustproof device for a heat sink including a first blade set and a second blade set. The first blade set includes a plurality of first blades arranged in parallel and at intervals. Each first blade has a first linking portion and a first blocking portion. The first blocking portion connects with the first linking portion, and the first blocking portion of the first blade forms a first opening with another first linking portion of an adjacent first blade. The second blade set is disposed at a lateral side of the first blade set. The second blade set includes a plurality of second blades arranged in parallel and at intervals. Each second blade has a second linking portion and a second blocking portion. The second blocking portion connects with the second linking portion, and the second blocking portion of the second blade forms a second opening with another second linking portion of an adjacent second blade. Wherein, dust or particles entering the first blade set will be blocked by the second blade set and fallen between the first blade set and the second blade set.

In order to achieve the object mentioned above, the present invention provides a dustproof device for a heat sink including a first blade set and a second blade set. The first blade set includes a plurality of first blades arranged in parallel and at intervals. Each first blade has a first linking portion and a first blocking portion connecting with the first linking portion. The first blocking portion of the first blade is bent and formed a first opening with another first linking portion of an adjacent first blade. The second blade set is disposed at a lateral side of the first blade set and includes a plurality of second blades arranged in parallel and at intervals. Each second blade has a second linking portion and a second blocking portion connecting with the second linking portion. The second blocking portion of the second blade is bent and formed a second opening with another second linking portion of an adjacent second blade. Wherein, dust or particle entering the first blade set and the second blade set therebetween from the first opening of the first blade, and dust or particles is stopped from entering the second opening by the second blocking portion of the second blade.

Comparing to the related art, the dustproof device of the present invention stops dust or particles outdoor from entering a heat sink by a first blade set and a second blade set arranged in multiple layers. The dustproof device of the present invention is particularly suitable for utilizing in a desert area. The dustproof device achieves a dustproof effect by multiple (layers) blockings of a first blade set and a second blade set. Therefore, the replacement frequency of filters will be reduced, and the maintenance cost of air condition equipment will be lowered.

BRIEF DESCRIPTION OF DRAWING

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

DETAILED DESCRIPTION OF THE PREFERRED EMBODIMENTS

In cooperation with attached drawings, the technical contents and detailed description of the invention are described thereinafter according to a number of preferable embodiments, being not used to limit its executing scope. Any equivalent variation and modification made according to appended claims is all covered by the claims claimed by the present invention.

Figure 1:
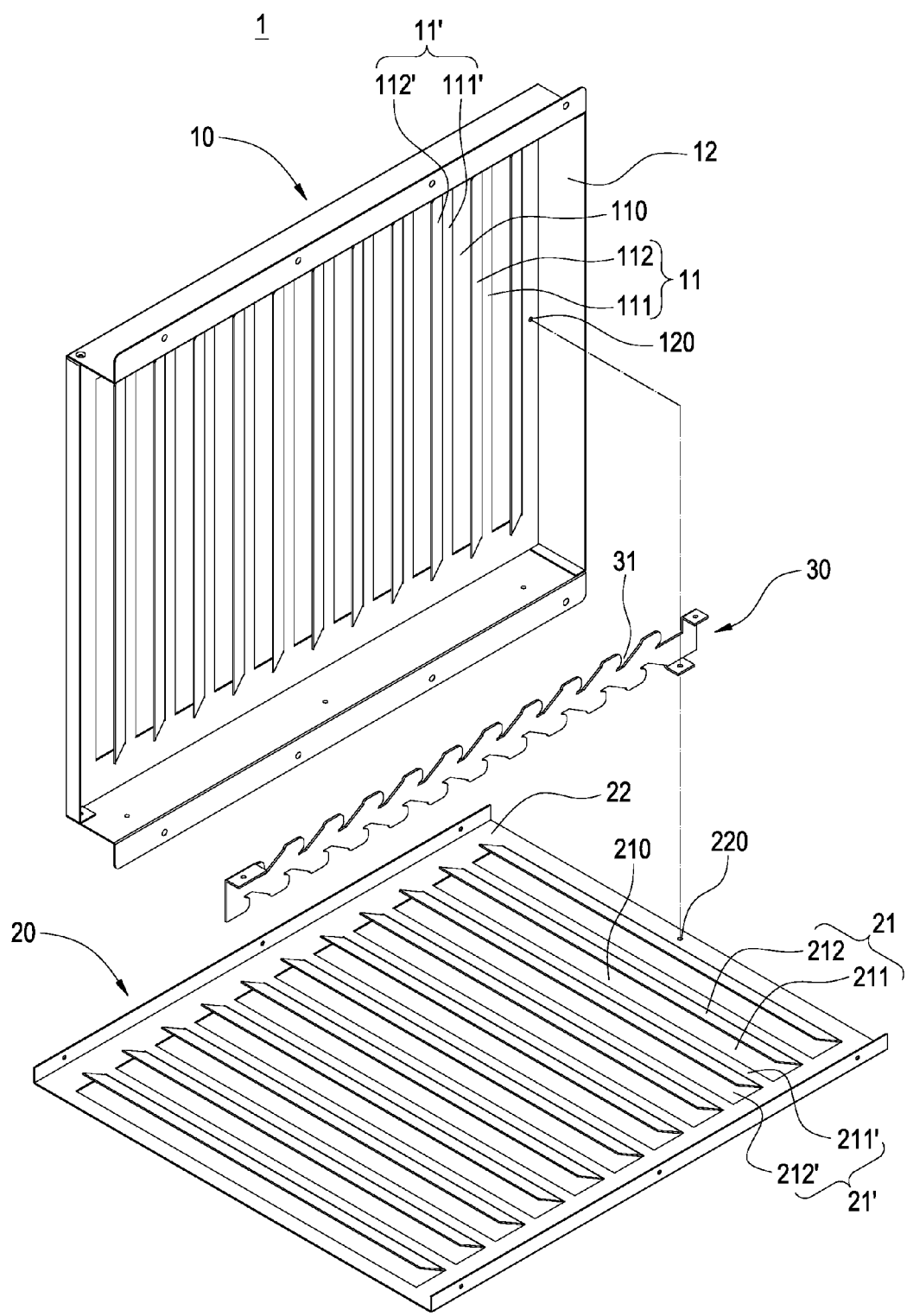
FIG. 1 is a perspective exploded view of a dustproof device for heat sink of the present invention.
Figure 2:
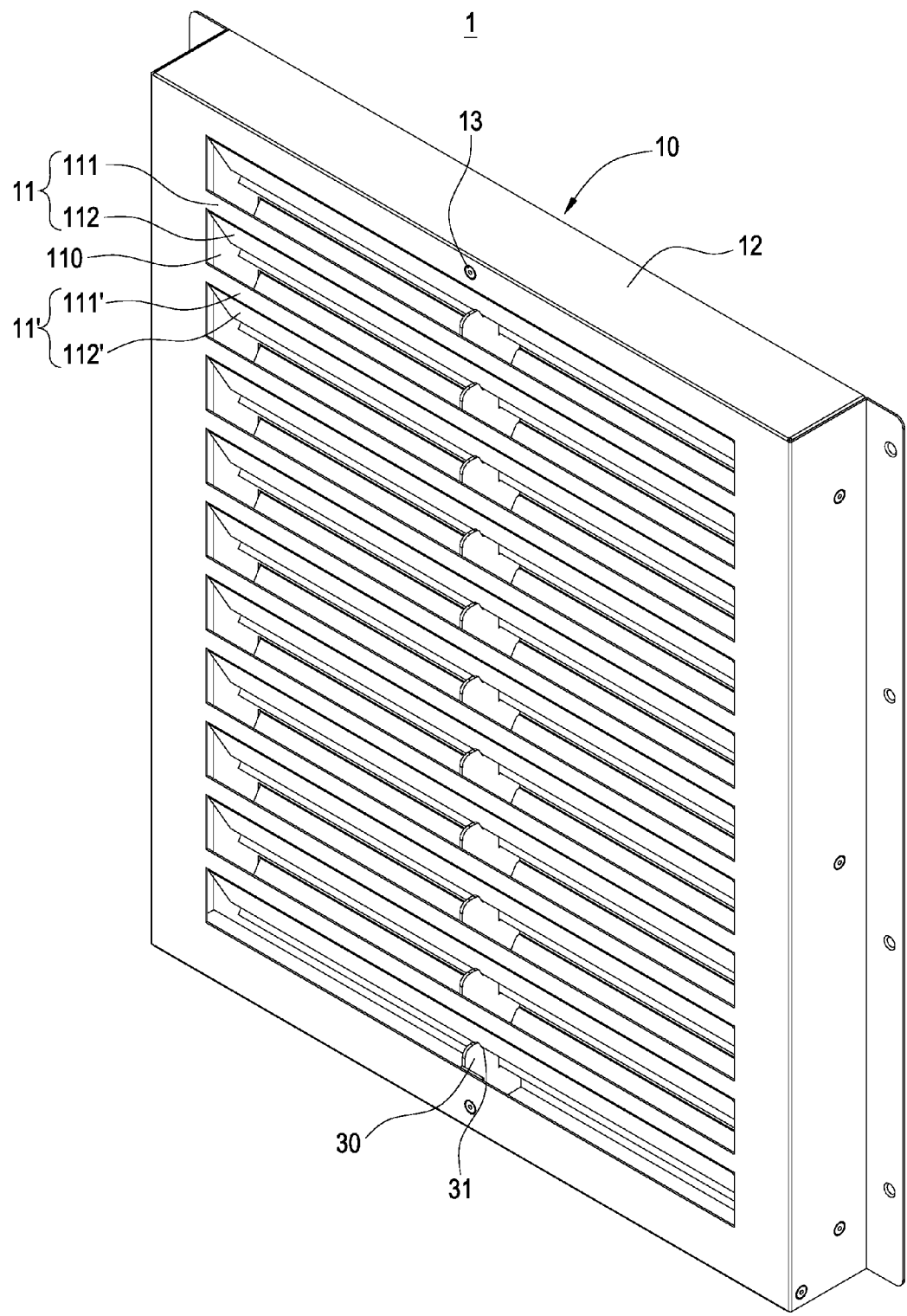
FIG. 2 is a perspective schematic view of a dustproof device for heat sink of the present invention.
Figure 3:
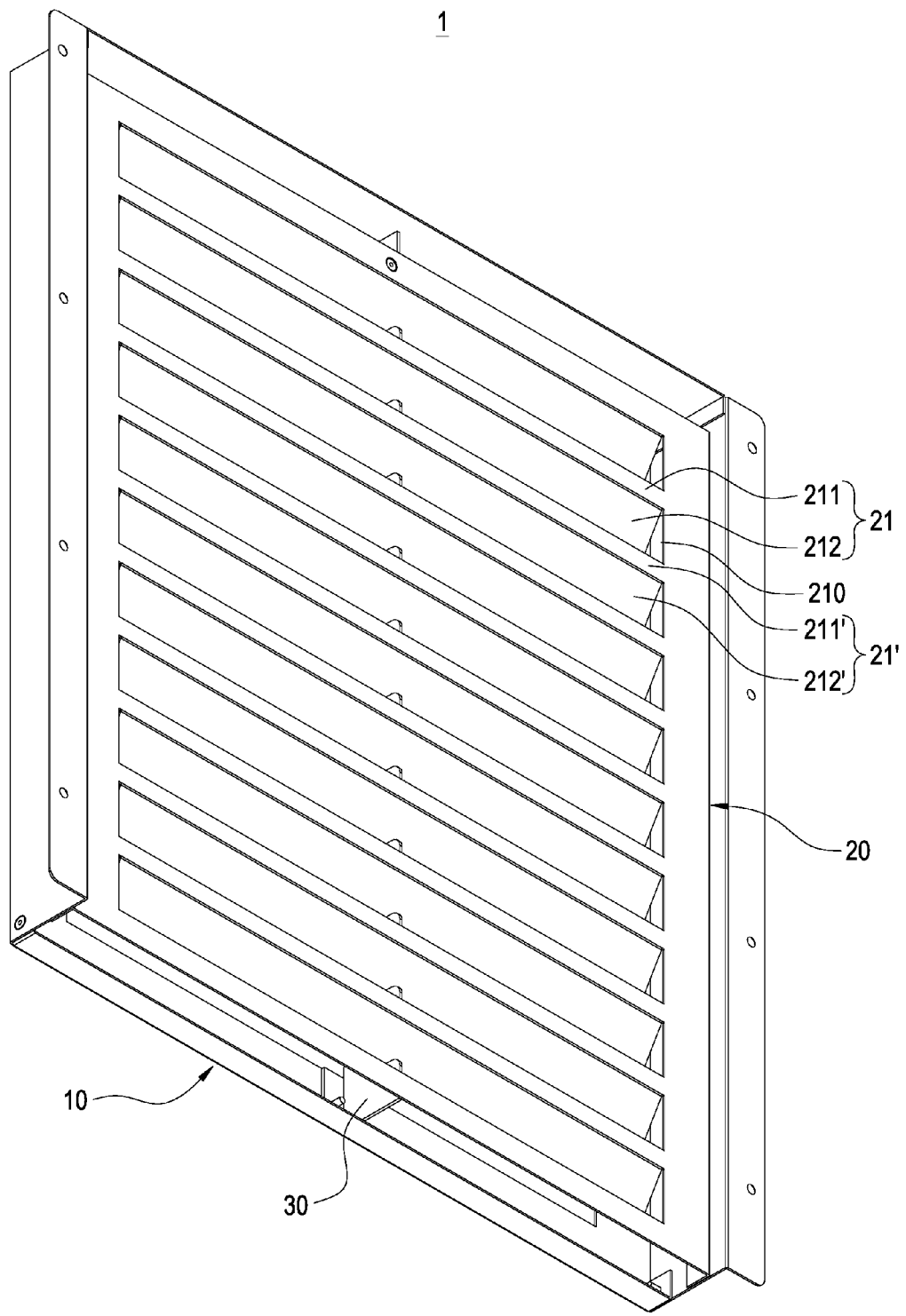
FIG. 3 is another perspective schematic view of a dustproof device for heat sink of the present invention.

Please refer to FIG. 1 to FIG. 3, they depict a perspective exploded view of a dustproof device for heat sink, a perspective schematic view of a dustproof device for heat sink, and another perspective schematic view of a dustproof device for heat sink of the present invention. The dustproof device 1 includes a first blade set 10, a second blade set 20 and a supporting plate 30. The first blade set 10 and the second blade set 20 are disposed in parallel, and the supporting plate 30 is disposed across the first blade set 10 and the second blade set 20.

The first blade set 10 includes a plurality of first blades 11, 11' arranged in parallel and at intervals. Taking the first blade 11 for example, the first blade 11 has a first linking portion 111 and a first blocking portion 112 extended from the first linking portion 111. Another first blade 11' neighboring the first blade 11 has a first linking portion 111' and a first blocking portion 112' extended from the first linking portion 111'. The first blocking portion 112 of the first blade 11 is bent in a direction and forms a first opening 110 with another first linking portion 111' of an adjacent first blade 11'.

The structures of the second blade set 20 are substantially the same with the first blade set 10. The second blade set 20 includes a plurality of second blades 21, 21' arranged in parallel and at intervals. Taking the second blade 21 for example, the second blade 21 has a second linking portion 211 and a second blocking portion 212 extended from the second linking portion 211. Another second blade 21' neighboring the second blade 21 has a second linking portion 211' and a second blocking portion 212' extended from the second linking portion 211'. The second blocking portion 212 of the second blade 21 is bent in a direction toward the first blade set 10 and forms a second opening 210 with another second linking portion 211' of an adjacent second blade 21'.

In an embodiment of the present invention, the first blade set 10 further includes a first frame 12. The first frame 12 is enclosed around an outer of the first blades 11, 11' and connected with first linking portions 111, 111' of the first blades 11, 11'. Similarly, the second blade set 20 further includes a second frame 22. The second frame 22 is enclosed around an outer of the second blades 21, 21' and connected with second linking portions 211, 211' of the second blades 21, 21'.

The second blade set 20 is parallelly disposed at a lateral side of the first blade set 10. The first frame has a plurality of first connecting holes 120, and the second frame 22 has a plurality of second connecting holes 220 corresponding to the first connecting holes 120. Furthermore, each first connecting hole 120 and each second connecting hole 220 have a fastening component 13 inserted respectively, the first frame 12 and the second frame 22 are connected together through the fastening components 13. Therefore, the second blade set 20 is fixed in a side of the first blade set 10.

Preferably, a supporting plate 30 is disposed across the first blade set 10 and the second blade set 20. The supporting plate 30 is provided for supporting the first blade set 10 and the second blade set 20. In the present invention, two sides of the supporting plate 30 have a plurality of notches 31. The locations of the notches 31 are disposed corresponding to the positions of the first blocking portions 112 of the first blade set 10 and the second blocking portions 212 of the second blade set 20 that a part of the first blocking portions 112 and the second blocking portions 212 are disposed on the notches 31.

Figure 4:
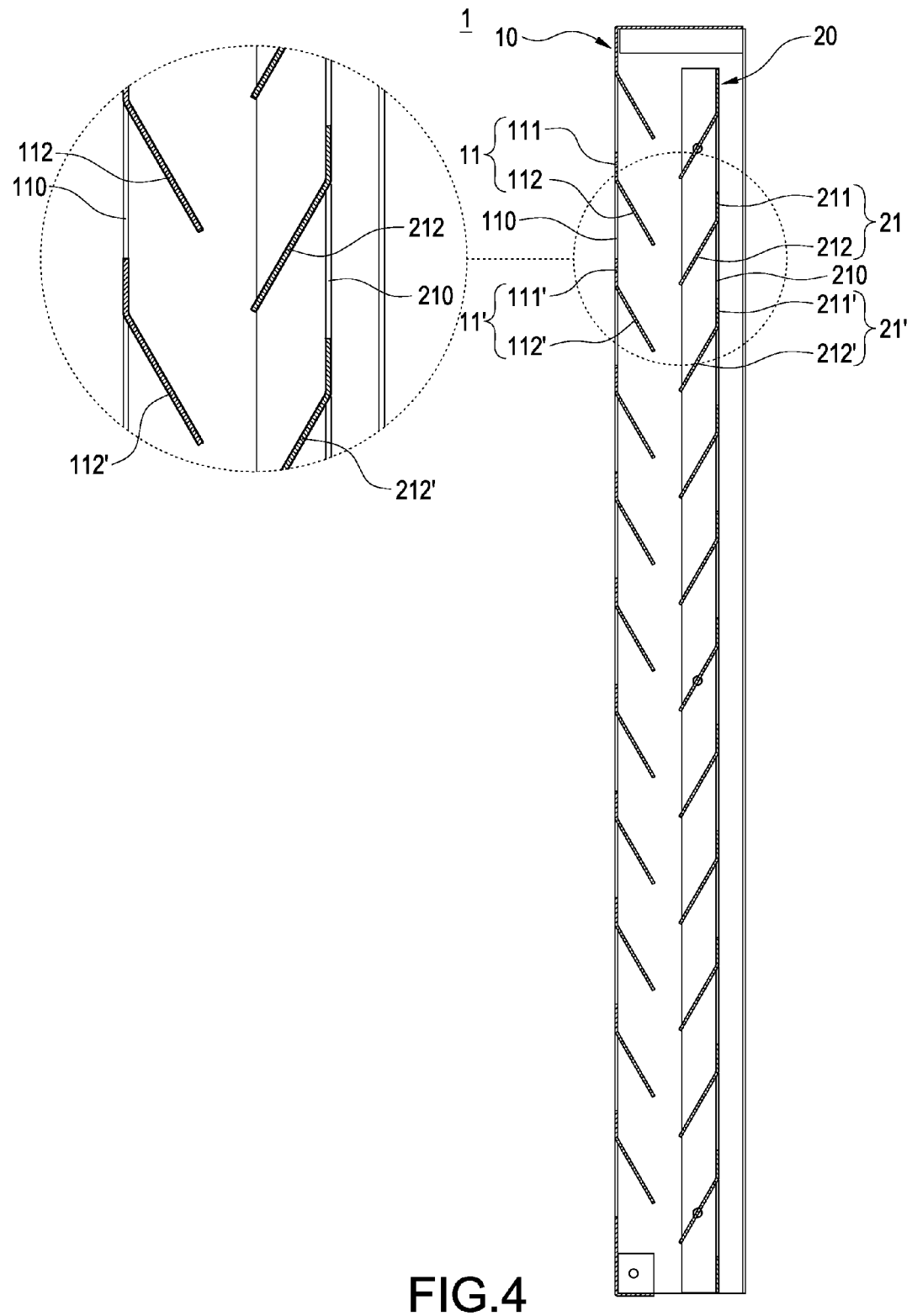
FIG. 4 is a cross sectional view of a dustproof device for heat sink of the present invention.

Please further referring to FIG. 4, it depicts a cross sectional views of a dustproof device for heat sink of the present invention. It shows that the first blades 11, 11' have first linking portions 111, 111' and first blocking portions 112, 112', and the second blades 21, 21' have second linking portions 211, 211' and second blocking portions 212, 212'. Moreover, the first blade set 10 has plural first openings 110, and the second blade set 20 has plural second openings 120.

From the FIG. 4, the first opening 110 and the second opening 120 are correspondingly provided in staggered manner. The first blocking portions 112, 112' of the first blade set 10 and the second blocking portions 212, 212' of the second blade set 20 are bent toward each other. Besides, the extension lines of the first blocking portion 112, 112' are located on the second blocking portions 212, 212' correspondingly.

Figure 5:
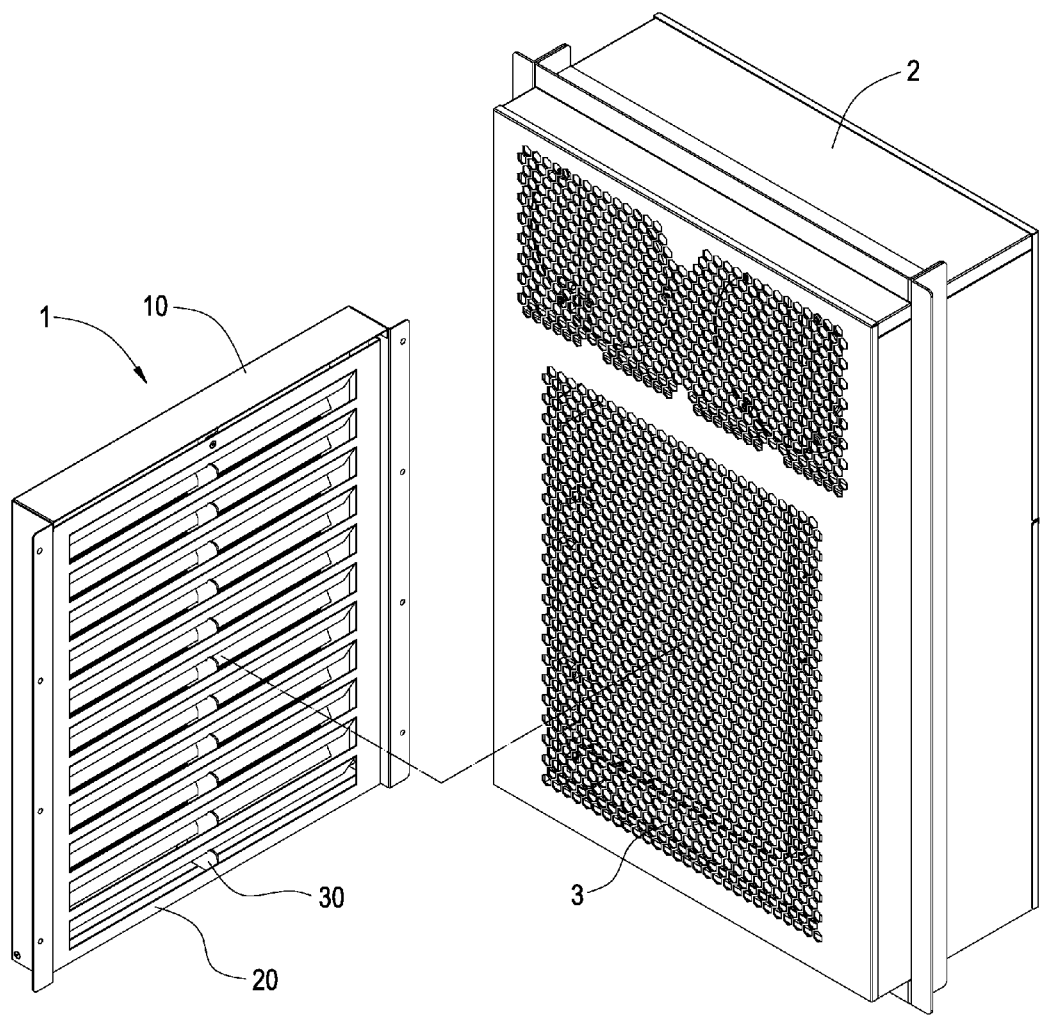
FIG. 5 is an assembly schematic view of a dustproof device combined with a heat sink of the present invention.
Figure 6:
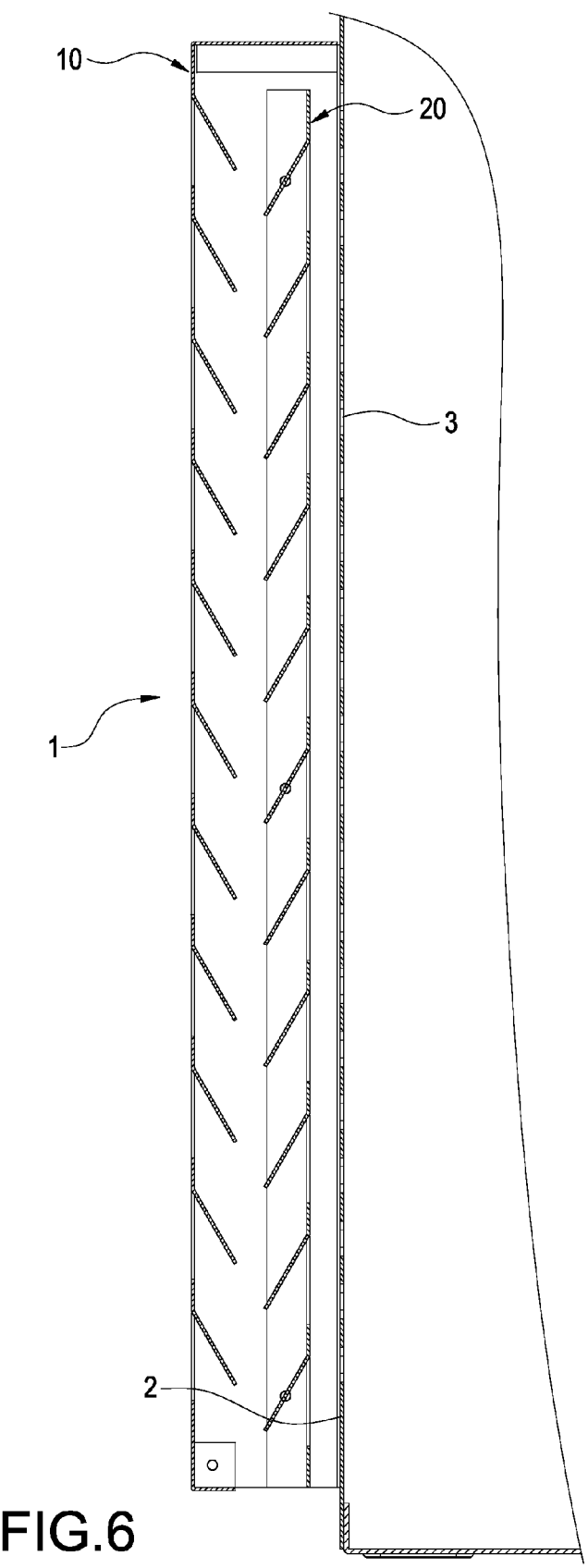
FIG. 6 is a cross sectional view of a dustproof device combined with a heat sink of the present invention.

Please also refers to FIG. 5 and FIG. 6, they depict an assembly schematic view and a cross sectional view of a dustproof device combined with a heat sink of the present invention. The dustproof device 1 of the present invention is assembled on a heat sink 2 for dust proof of the heat sink 2. The heat sink 2 has an air inlet 3. The first blade set 10 and the second blade set 20 are disposed in a lateral side of the air inlet 3, and the second blade set 20 is disposed between the first blade set 10 and the air inlet 3. In the present invention, the first frame 12 and the second frame 22 covers the air inlet 3.

Please also refers to FIG. 4, it shows that the dustproof 1 of the present invention is applied in the heat sink 2. The first blocking portions 112, 112' are bent in a direction toward the heat sink 2, and the second blocking portions 112, 112' are bent in a direction away from the heat sink 2.

Figure 7:
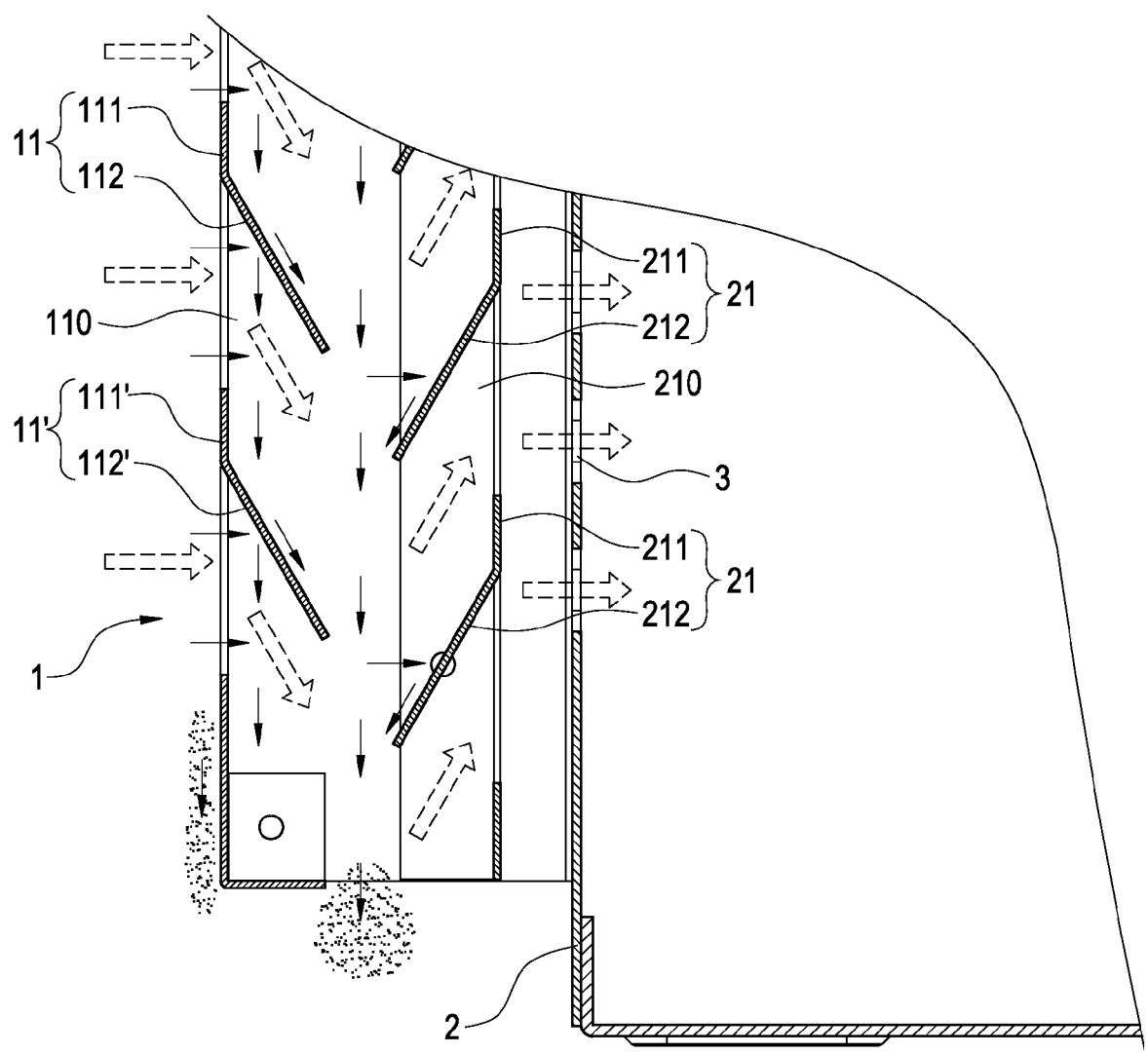
FIG. 7 is an operating schematic view of a dustproof device combined with a heat sink of the present invention.

Please refers to FIG. 7, it depicts an operating schematic view of a dustproof device combined with a heat sink of the present invention. While dust or particles blowing into the dustproof device 1 with outside air, some part of the dust will be blocked by the first blade set 10 and fallen out of the dustproof device 1, and some part of the dust entering the first blade set 10 will be blocked by the second blade set 20 and fallen between the first blade set 10 and the second blade set 20. Finally, only less dust or particle can blew into the air inlet 3. Accordingly, the probability of dust or particles blew into the heat sink 2 will be reduced.

Figure 8:
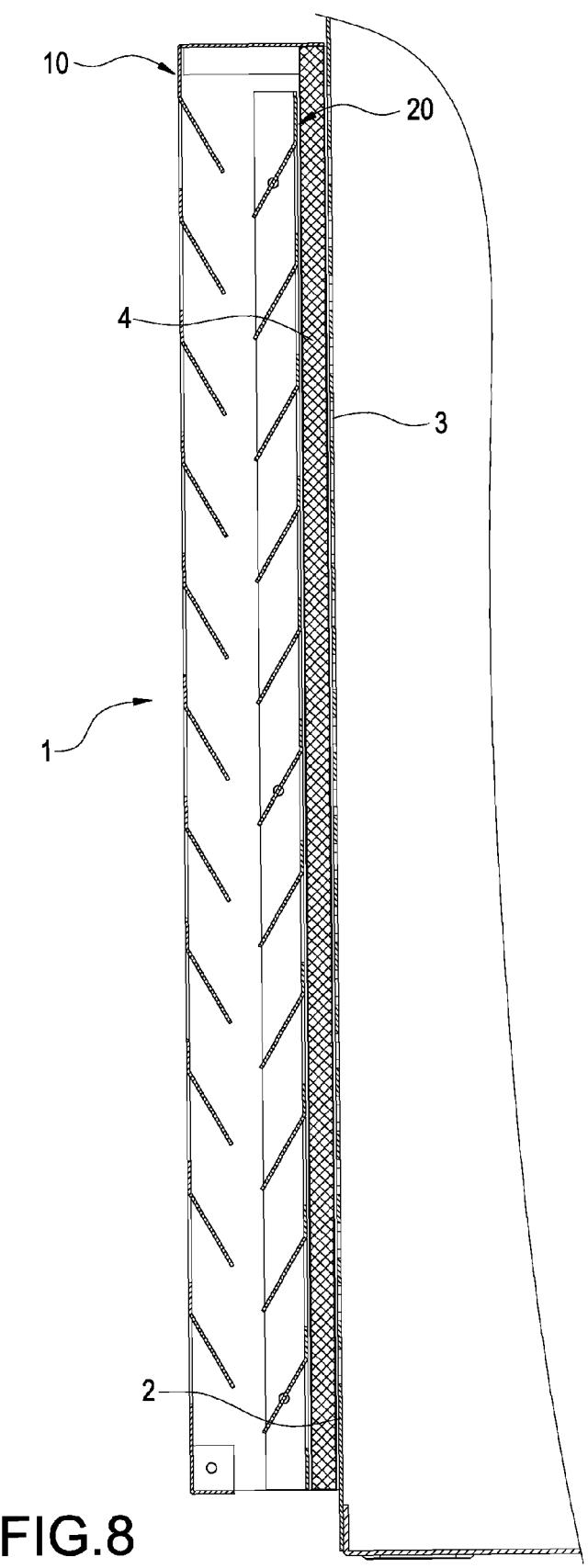
FIG. 8 is another operating schematic view of a dustproof device combined with a heat sink of the present invention.

Please refer to FIG. 8, it depicts another operating schematic view of a dustproof device combined with a heat sink of the present invention. A filter 4 can be installed for filtering dust or particles when the dustproof device 1 of the present invention is used. The filter 4 is installed between the second blade set 20 and the air inlet 3 that can prevent the dust or particles from entering the air inlet 3, thus improving the dust proof effect.

It is worth note that the dustproof device 1 of the present invention can increase the quantity of the first blade set 10 and the second blade set 20 for achieving a better dust proof effect by multiple blockings.

Although the present invention has been described with reference to the preferred embodiment thereof, it will be understood that the invention is not limited to the details thereof. Various substitutions and improvements have been suggested in the foregoing description, and others will occur to those of ordinary skill in the art. Therefore, all such substitutions and improvements are intended to be embraced within the scope of the invention as defined in the appended claims.

What is claimed is:

1. A dustproof device for a heat sink, the heat sink having an air inlet, the dustproof device comprising:
   a first blade set disposed in a lateral side of the air inlet, the first blade set including a plurality of first blades arranged in parallel and at intervals, each first blade having a first linking portion and a first blocking portion extended from the first linking portion, the first blocking portion being a free end and bent in a direction toward the heat sink and forming a first opening with another first linking portion of an adjacent first blade; and
   a second blade set disposed between the first blade set and the air inlet, the second blade set including a plurality of second blades arranged in parallel and at intervals, each second blade having a second linking portion and a second blocking portion extended from the second linking portion, the second blocking portion being a free end and bent in a direction away from the heat sink and forming a second opening with another second linking portion of an adjacent second blade,
   wherein an extension line of the first blocking portion is located on the second blocking portion.

2. The dustproof device according to claim 1, wherein the first blade set further includes a first frame, the first frame is enclosed around an outer of the first blades and connected with first linking portions of the first blades.

3. The dustproof device according to claim 2, wherein the second blade set further includes a second frame, the second frame is enclosed around an outer of the second blades and connected with second linking portions of the second blades.

4. The dustproof device according to claim 3, wherein the first frame has a plurality of first connecting holes, and the second frame has a plurality of second connecting holes, each first connecting hole and each second connecting hole have a fastening component correspondingly, the first frame and the second frame are connected together through the fastening components.

5. The dustproof device according to claim 1, further including a supporting plate disposed across the first blade set and the second blade set, wherein two sides of the supporting plate have a plurality of notches, one part of each first blocking portion and one part of each second blocking portion are disposed on each of the notches correspondingly.

6. The dustproof device according to claim 1, wherein the first opening and the second opening are staggered to each other.

7. The dustproof device according to claim 1, further including a filter, wherein the filter is disposed between the second blade set and the air inlet.

8. A dustproof device for a heat sink, comprising:
   a first blade set provided in a lateral side of the heat sink, including a plurality of first blades arranged in parallel and at intervals, each first blade having a first linking portion and a first blocking portion, the first blocking portion being a free end and connecting with the first linking portion, the first blocking portion of the first blade forming a first opening with another first linking portion of an adjacent first blade; and
   a second blade set disposed between the first blade set and the heat sink, the second blade set including a plurality of second blades arranged in parallel and at intervals, each second blade having a second linking portion and a second blocking portion, the second blocking portion being a free end and connecting with the second linking portion, and the second blocking portion of the second blade forming a second opening with another second linking portion of an adjacent second blade;
   wherein, an extension line of the first blocking portion is located on the second blocking portion, and dust or particles entering the first blade set is blocked by the second blade set and fallen between the first blade set and the second blade set.

9. The dustproof device according to claim 8, wherein the first blade set further includes a first frame, the first frame is enclosed around an outer of the first blades and connected with first linking portions of the first blades.

10. The dustproof device according to claim 8, wherein the heat sink has an air inlet, and the first frame covers the air inlet.

11. The dustproof device according to claim 10, further including a filter, wherein the filter is disposed between the first blade set and the air inlet.

12. The dustproof device according to claim 8, wherein the first frame has a plurality of first connecting holes, and a fastening component is inserted in each first connecting hole.

13. The dustproof device according to claim 8, further including a supporting plate disposed cross the first blade set, wherein two sides of the supporting plate have a plurality of notches, one part of each first blocking portion is disposed on each of the notches correspondingly.

14. A dustproof device for a heat sink, comprising:
   a first blade set provided in a lateral side of the heat sink, including a plurality of first blades arranged in parallel and at intervals, each first blade having a first linking portion and a first blocking portion connecting with the first linking portion, the first blocking portion of each first blade a free end and bent and forming a first opening with another first linking portion of an adjacent first blade; and
   a second blade set disposed between the first blade set and the heat sink, the second blade set including a plurality of second blades arranged in parallel and at intervals, each second blade having a second linking portion and a second blocking portion connecting with the second linking portion, the second blocking portion of each second blade being a free end and bent and forming a second opening with another second linking portion of an adjacent second blade;
   wherein, an extension line of the first blocking portion is located on the second blocking portion, and dust or particles entering the first blade set and the second blade set therebetween from the first opening of the first blade is stopped from entering the second opening by the second blocking portions of the second blades.

15. The dustproof device according to claim 14, wherein the second blade set further includes a second frame, wherein the second frame is enclosed around an outer of the second blades and connected with second linking portions of the second blades.

16. The dustproof device according to claim 15, wherein the heat sink has an air inlet, and the second frame covers the air inlet.

17. The dustproof device according to claim 16, further including a filter, wherein the filter is disposed between the second blade set and the air inlet.

18. The dustproof device according to claim 14, wherein the second frame has a plurality of second connecting holes, and a fastening component is inserted in each of the second connecting holes.

19. The dustproof device according to claim 14, further including a supporting plate disposed cross the second blade set, wherein two sides of the supporting plate have a plurality of notches, one part of each second blocking portion is disposed on each of the notches.

* * * * *